June 17, 1930.   A. L. CORNWELL   1,764,243
WHEEL PULLER
Filed March 16, 1929
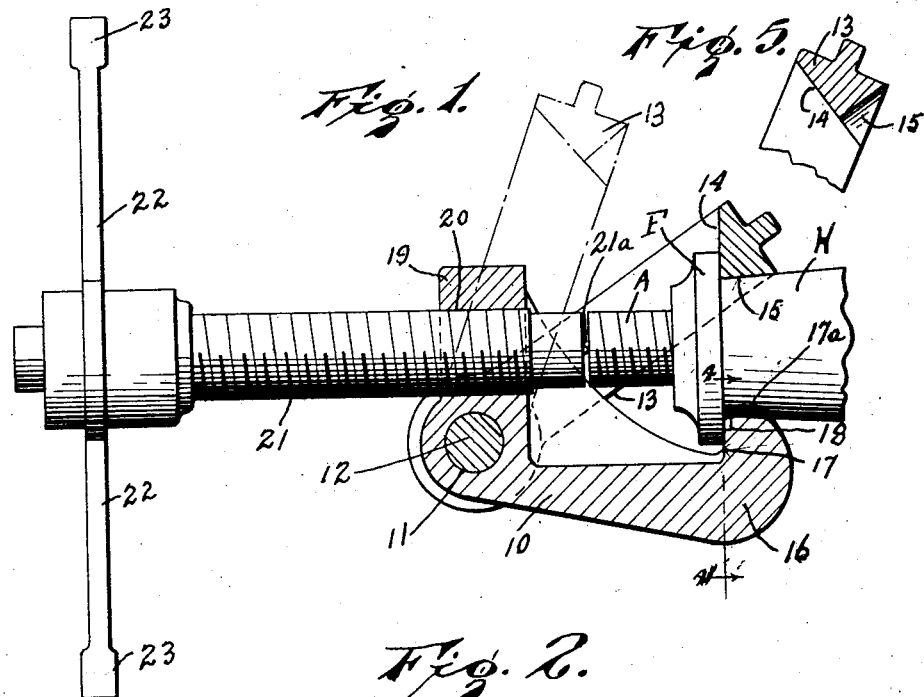
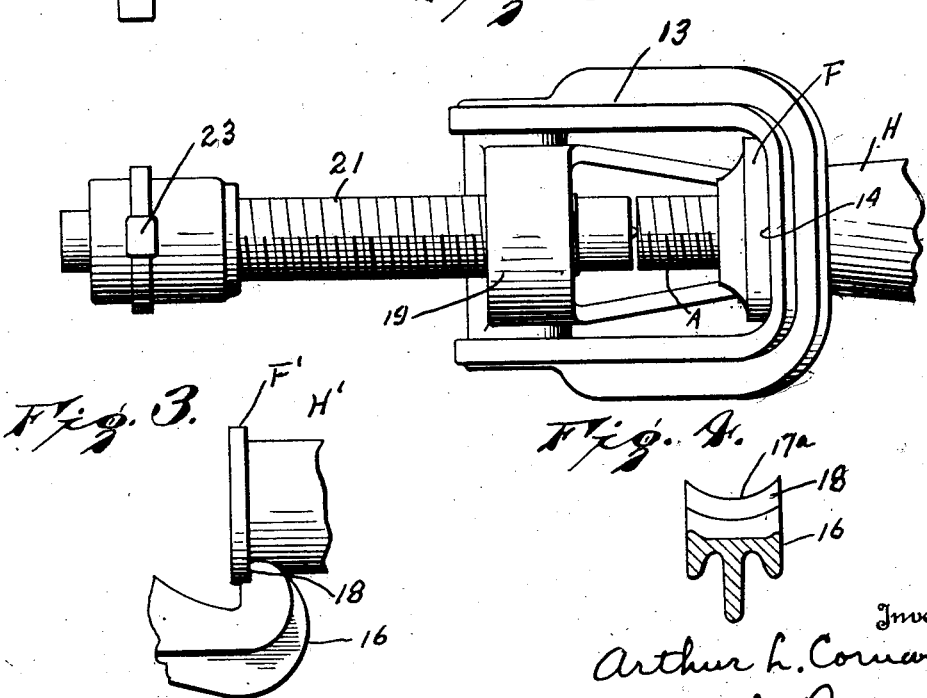
Inventor
Arthur L. Cornwell,
Clyde L. Rogers
By his Attorney Patented June 17, 1930

1,764,243

UNITED STATES PATENT OFFICE

ARTHUR L. CORNWELL, OF WELLSVILLE, NEW YORK

REISSUED

WHEEL PULLER

Application filed March 16, 1929. Serial No. 347,571.

This invention relates to devices for pulling gears or wheels from axles or shafts on which they are mounted, and while having other and more general fields of usefulness, is well adapted and designed for removing wheel hubs of automobiles from axles on which they are fitted. The particular embodiment of the invention herein illustrated is especially designed for wheel puller uses on the current types of Ford cars and trucks, as will be hereinafter more fully explained. A principal object of the invention is to provide a wheel puller of this type that is capable of being easily and quickly applied with the capability of engaging the hub flange or equivalent strongly and reliably at opposite sides thereof, exerting an evenly distributed pull at opposite sides of the hub with a gripping effect or clamping effect upon the hub that increases automatically and correspondingly with the increase of pull. Further objects are to provide a simple, strong and reliable device that is instantly and easily adjusted to different sizes and designs of wheel hubs within its range with an equally effective clamping and pulling action upon each of the different types and sizes of hubs for which it is designed. The foregoing and other objects and advantages of the invention will be better understood from the following detailed description taken in connection with the accompanying drawings and the distinctive features of novelty will be thereafter pointed out in the appended claims.

Referring to the drawings:

Fig. 1 is a view partly in elevation and partly in longitudinal section showing a preferred embodiment of the invention applied to the wheel hub of a current Ford truck.

Fig. 2 is an elevation at right angles to Figure 1.

Fig. 3 is a fragmentary elevation showing the manner of engagement of the device with the hub of a current type of Ford car and;

Fig. 4 is a fragmentary section taken on line 4—4 of Fig. 1, and Fig. 5 is a sectional detail illustrative of the pivoted latch structure.

10 indicates the body of the device which is of stout integral construction provided at an intermediate point with a bore 11, which provides a bearing for a stout pin 12. This pin has its ends engaged in the sides of a stout latch or stirrup member 13, which is thus pivoted to the body 10. This latch or stirrup is of a dimension so that its sides will clear the hub flange of the different types of hub for which the device is designed, and its intermediate portion is formed with a ledge 14 inclined with reference to the body portion of the latch to an extent so that when the latch is swung down behind the flange F of the wheel hub, this ledge will be approximately flush with the inner side of said flange, i. e., transverse of the axial line of the hub. The latch 13 at the locality of engagement with the hub is concaved as indicated at 15, so as to approximately fit the circumference of the hub, so that the latch or stirrup is adapted to fit in closely against the flange F and down to the base thereof as indicated in Fig. 1 when the device is applied for use. The body 10 is also equipped with a hook or beak portion 16 extending from the pivot bore 11 approximately the same distance as the latch 13 and formed with a transverse ledge 17 adapted to be applied to the hub flange F opposite the ledge 14 of the latch and to fit closely in against the hub, being also for this purpose preferably somewhat concaved as indicated at 17$^a$. The beak 16 with its ledge 17 is so designed with reference to the latch 13, that the ledge 17 will lie flush against the hub flange in co-operation with the ledge 14 for a given size of hub, i. e., as shown for the hub of a Ford truck. When the device is to be applied to a smaller hub, e. g., the current type of Ford passenger car, a portion of the hub of which is indicated in Fig. 3 at H', the beak and latch, of course, have to swing in farther towards each other, and to effect the proper engagement of the beak with the flange F' of this hub, the beak is provided with a notch or recess 18 in its extremity of a size adapted to receive the flange F' and engage it snugly.

The body 10 is provided with an inward arm or extension 19 approximately at right angles to the beak 16, and this arm is formed with a threaded bore 20 adapted to receive a threaded operating stem 21. This stem has an extremity 21ᵃ adapted to engage the end of the wheel axle A to exert the requisite pressure thereon for extracting the hub therefrom. The stem 21 has its outer end equipped with a suitable operating instrumentality, shown as transversely extending arms 22, 22, the extremities of which may be formed with enlarged heads 23 permitting a hammer or like impact tool to be used for starting the hub.

It will be noted that by the described construction, and as illustrated, the pressure exerted by the threaded stem 21 is directly intermediate the hub engaging ledges 14, 17, of the latch and beak respectively, so that the operative pressure is always applied directly in line with the hub axis, also that the clamping effect of the latch and beak against the opposite sides of the hub increases progressively as the operative pressure increases, so there is no danger of the device slipping off to injure the hub or puller. By the provision of the supplemental notch seat 18, the device is correctly centered for a range of smaller sizes of hubs as well as for a range of larger sizes.

With the described construction an exceptionally rugged tool is provided with low machining costs and with a capability of being instantly applied to the hub, and as quickly removed therefrom.

I am aware that the invention may be embodied in other forms without departing from the spirit or essential attributes thereof, and I, therefore, desire the present embodiment to be considered in all respects as illustrative and not restrictive, referring to the appended claims rather than to the foregoing description to indicate the scope of the invention.

Having now described my invention, what I claim is new and what I desire to secure by Letters Patent is:

1. A device of the kind described comprising a body equipped with a hub engaging beak, a yoke shaped latch pivoted to said body equipped to engage the hub opposite said beak, said body equipped with an offset extension, and an operating stem threaded in said extension adapted to engage the end of an axle within said hub.

2. A wheel puller comprising a body member equipped with a hub engaging ledge, a member pivoted to said body at a point relatively remote from said ledge and also having a ledge to engage a wheel hub, said body having an offset portion, and an operating stem fitted in said offset portion adapted to engage a wheel axle within such hub, said stem having an operating handle.

3. A wheel puller comprising a body equipped with a hub engaging ledge, said ledge having a notch in the outer portion thereof for the purpose stated, a member pivoted to said body equipped with a ledge adapted to co-operate with the ledge on said body for engaging a wheel hub at opposite sides thereof, and an operating stem threaded in said body in relatively offset and transverse relation to said pivot adapted to engage the end of a wheel axle within such hub and to exert pressure in a direct axial line thereof.

ARTHUR L. CORNWELL.